July 15, 1969     E. O. MARTINSON     3,455,334
SERVO VALVE
Filed Dec. 6, 1965     2 Sheets-Sheet 1
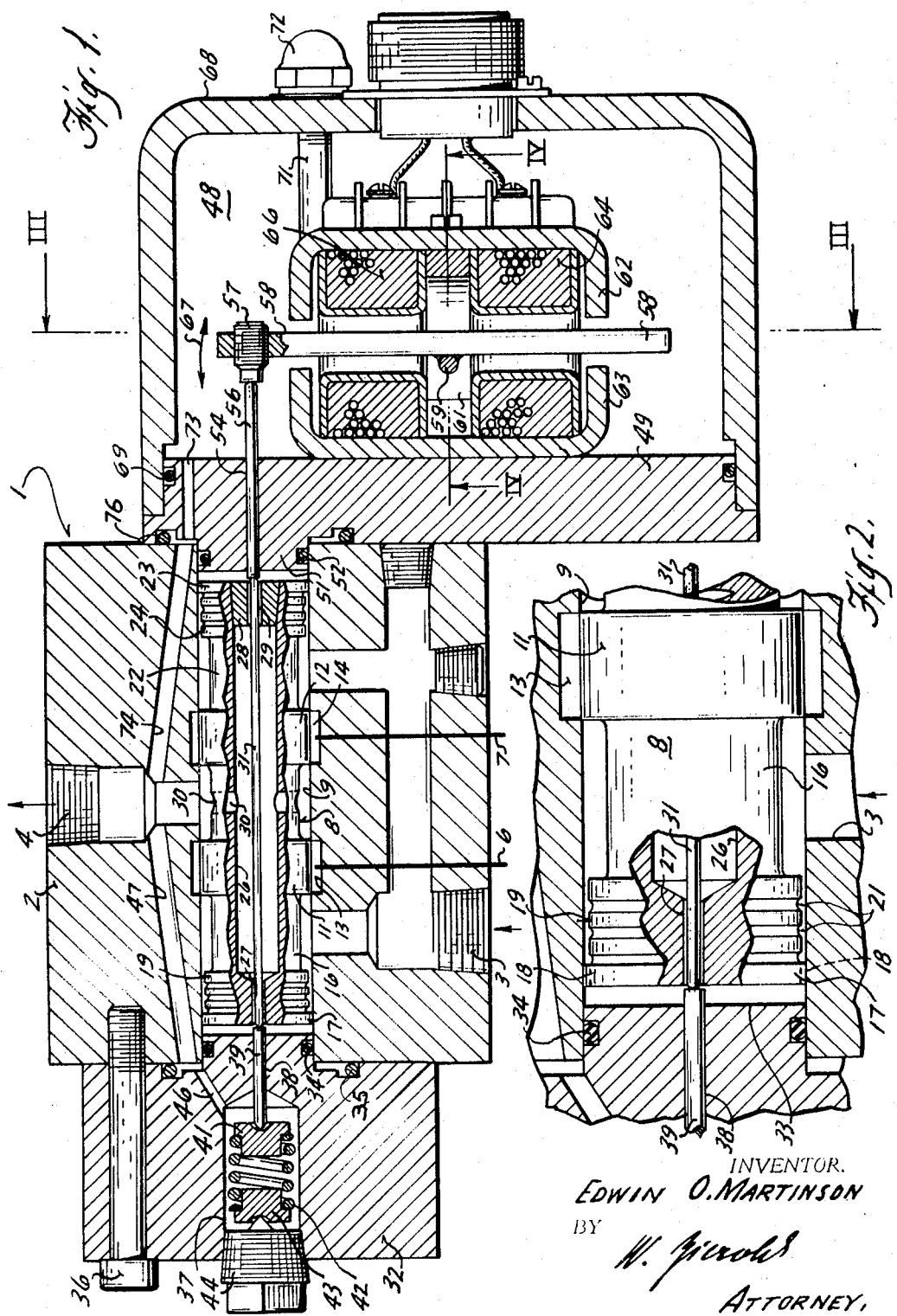
INVENTOR.
EDWIN O. MARTINSON
BY
ATTORNEY.

July 15, 1969  E. O. MARTINSON  3,455,334
SERVO VALVE

Filed Dec. 6, 1965  2 Sheets-Sheet 2

INVENTOR.
EDWIN O. MARTINSON
BY
ATTORNEY.

United States Patent Office 3,455,334
Patented July 15, 1969

3,455,334
SERVO VALVE
Edwin O. Martinson, Milwaukee, Wis., assignor to
Koehring Company, Milwaukee, Wis., a corporation of Wisconsin
Filed Dec. 6, 1965, Ser. No. 511,628
Int. Cl. F16k 31/02
U.S. Cl. 137—625.61    5 Claims

ABSTRACT OF THE DISCLOSURE

A two stage hydraulic servo valve has a signal responsive pilot stage which balances and unbalances axial thrust forces acting in opposite directions upon a reciprocable valve spool of a power stage, the thrust forces, when balanced, holding the valve spool in a neutral position and, when unbalanced, shifting it into operative positions.

---

The invention relates to hydraulic valves, and it is concerned more particularly with the type of valve generally known as a two-stage servo valve.

According to conventional practice the first stage of such a valve is a pilot stage and usually comprises a hydraulic amplifier for converting a varying, relatively weak signal force, such as the output of an electrically energized torque motor, into a relatively strong output force. The second stage is a power stage and usually comprises a reciprocable valve element which is stroked by the output power of the first stage so as to control the flow of pressure fluid to and from a load such as a double acting hydraulic cylinder.

Generally, it is an object of the invention to provide an improved two-stage servo valve which is relatively simple and compact, efficient in operation and which may be manufactured at relatively low costs.

More specifically it is an object of the invention to provide a two-stage servo valve having improved operating characteristics, particularly in the matter of signal amplification, sensitivity to small signal variations, and actuation of the power stage under highly transient signal conditions.

Still another object of the invention is to provide an improved two-stage servo valve of the above mentioned character which is largely immune to fluid contamination by particles of foreign matter such as metal chips, rubber fragments and the like.

A further object of the invention is to provide an improved electrohydraulic servo mechanism wherein an electrically energized torque motor and a two-stage servo valve are combined in such a manner that progressive displacement of the movable element of the torque motor from a neutral position in opposite directions causes an equal progressive displacement of a reciprocable valve spool from a neutral position in opposite directions in the power stage of the servo valve.

A further object of the invention is to provide an improved electrohydraulic servo mechanism of the above mentioned character which requires an extremely low amount of electrical energy to operate the amplifier stage of the servo valve.

These and other objects and advantages are attained by the present invention, various novel features of which will become apparent from the description herein and the accompanying drawing illustrating a prefered embodiment of the invention. Referring to the drawing:

FIG. 1 is a sectional view of a two-stage servo valve and associated torque motor embodying the invention;

FIG. 2 is an enlarged view of part of the valve shown in FIG. 1 and illustrating details of a pilot valve at one end of the valve spool of the power stage;

Figure 3:
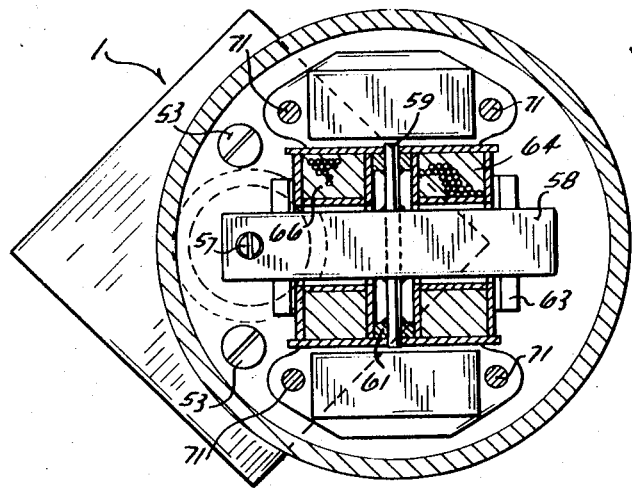
FIG. 3 is a sectional view taken on line III—III of FIG. 1.

The valve mechanism shown in FIG. 1 comprises a main valve affording a power stage and generally designated by the reference character 1. A housing part 2 of the main valve has a fluid inlet passage 3, a fluid outlet passage 4, and two control passages schematically indicated by lines 6 and 7. For use in a hydraulic circuit, the inlet passage 3 may be connected to a pressure source, not shown; the outlet passage may be connected to a fluid storage tank, not shown, and the control passages 6 and 7 may be connected in conventional manner to a load, such as a double acting hydraulic cylinder, not shown.

A valve spool generally designated by the reference character 8 is reciprocably mounted in a valve bore 9 of the housing part 2 and is operable in accordance with the well known operating principles of a closed center type spool valve to control the flow of pressure fluid through the passages 3, 4, 6 and 7. Briefly, fluid from the inlet passage 3 is admitted to the valve bore 9 at the axially outer sides of axially spaced lands 11 and 12 of the valve spool 8. The outlet passage 4 communicates with the valve bore 8 at the space between the lands 11 and 12. The axial widths of the lands 11 and 12 are equal, within close limits, to the axial widths of annular ports 13 and 14, respectively, from which the control passages 6 and 7 extend to the exterior of the housing part 2 in the usual manner.

Figure 5:
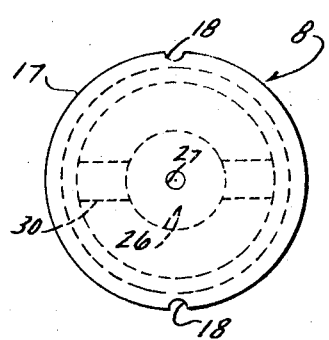
FIG. 5 is an enlarged end view of the valve spool of the power stage.

The fluid pressure inlet into the valve bore 9 at the axially outer side of the land 11 is bridged by a barrel portion 16 of the valve spool 8, the barrel portion presenting at its free end a collar 17 in closely fitting axial sliding engagement with the valve bore 9. As shown in FIGS. 2 and 5, the collar 17 has two diametrically opposed radial recesses 18 which present axial passages in fluid receiving relation with the inlet passage 3 of the housing 2 and in fluid delivering relation with an expandable and contractable fluid compartment which, as will be explained more fully hereinbelow, is formed at the axially outer end of the barrel portion 16. At the axially inner side of the collar 17 the barrel portion 16 of the valve spool 8 has a radial annular shoulder 19 which has a slightly smaller diameter than the surrounding cylindrical wall of the valve bore 9. Three peripheral grooves 21 are formed in the shoulder 19 intermediate its ends. The clearance between the full diameter portions of the shoulder 19 and the surrounding cylindrical wall of the valve bore 9 is sufficiently small, preferably in the order of a few ten thousandths of an inch, so as to produce an appreciable restricting effect upon the flow of fluid therethrough at a relatively high pressure, such as several thousand pounds per square inch. In addition to the flow restricting effect, the close clearance relation between the valve spool shoulder 19 and the valve bore 9 is intended to produce a filtering action, as will be pointed out more fully hereinbelow.

The details of construction at the left end of the valve spool 8 which have been explained hereinbefore are duplicated at the right end of the valve spool as shown in FIG. 1. That is, the pressure fluid inlet into the valve bore 9 at the axially outer side of the land 12 is bridged by a barrel portion 22 which has an end collar 23 and grooved shoulder 24 corresponding to the end collar 17 and grooved shoulder 19. The end collar 23 has diametrical recesses providing axial passages in fluid receiving relation with the inlet passage 3 of the housing 2 and in fluid delivering relation with an expandable and contractable fluid compartment which is formed at the axially outer end of the barrel portion 22 as will be pointed out more fully hereinbelow.

Referring further to the construction of the valve spool 8, it will be noted that an axial bore 26 extends into it from the right end and terminates a short distance from its left end, leaving a body poriton which has an axial end bore 27 of substantially smaller diameter than the bore 26. The right end of the bore 26 is tapered and has a plug 28 installed in it, the plug having a end bore 29 of the same diameter as through bore 27 and in axial alinement therewith. A radial bore 30 between the lands 11 and 12 connects the bore 26 with the outlet passage 4 of the valve housing 2.

Extending axially through the bore 26 and through bores 27 and 29 is a cylindrical control rod 31 having spherically rounded opposite ends and an overall length slightly longer than the axial distance between the axially opposite end faces of the valve spool presented, respectively, by the plane radial end faces of the barrel portions 16 and 22. The control rod 31 is reciprocably supported in the end bores 27 and 29, and it is cross sectionally dimensioned to approximate the cross sectional dimensions of these bores, that is, of the axial spool passage at the opposite ends of the latter. Preferably, the radial clearance of the rod 31 in the bores 27 and 29 is in the order of a few thousandths of an inch. The overall length of the control 31 measured from the apex of the spherically rounded outer surface at one end to the apex of the spherically rounded surface at the other end exceeds the axial distance between the plane radial end faces of the valve spool by only a small amount, such as a few thousandths of an inch.

Secured to the face of the housing part 2 at the left side of FIG. 1 is an end closure 32 for the left end of the valve bore 9. The end closure 32 comprises a cylindrical body portion outside of the housing part 2 and a short cylindrical shoulder 33 projecting into the bore 9 and sealed thereto by an O-ring 34 (FIG. 2). A suitable number of bolts one of which is shown at 36 secure the end closure 32 to the housing part 2, an O-ring 35 being interposed between the adjoining faces of the end closure 32 and housing part 2 for sealing purposes as will appear more fully hereinbelow.

A bore 37 extends axially into the end closure 32 and is connected at its inner end with the valve bore 9 by a smaller diameter bore 38 in alinement with the control rod 31. The diameter of the bore 38 is appreciably larger than the diameter of the spool bore 27, and a cylindrical pilot valve plunger 39 is reciprocably mounted in the bore 38, the diameter of the plunger 39 closely approximating the diameter of the bore 38 to afford a running fit, and being larger than the diameter of the spool bore 27. The axially inner end of the valve plunger 39 has a plane radial end face which upon axial back and forth movement of the plunger cooperates with the adjacent plane radial end face of the valve spool 8 to control the flow of fluid from the left end of the valve bore 9 through the spool bore 27.

The axially outer end of the pilot valve plunger 39 is pointed and seated in a tapered recess of a floating bearing block 41. A coil spring 42 bears at one end against the bearing block 41 and at its other end against a swivel block 43 which in turn is seated on a pointed boss of a plug 44. The plug 44 is screw threaded into the bore 37 and may be moved in or out to vary the compression of the spring 42. Drain passages 46 and 47 in the end closure 32 and valve housing 2, respectively, connect the bore 37 with the outlet 4 of the valve housing for the escape of seepage fluid which may leak past the pilot valve plunger 39.

An electric torque motor generally designated by the reference character 48 is rigidly secured to the side of the valve housing 2 opposite to the end closure 32. A base plate 49 of the torque motor provides an end closure for the right hand end of the valve bore 9, a short cylindrical shoulder 51 of the base plate projecting into the valve bore 9 and being sealed therein by an O-ring 52. The base plate 49 is secured to the valve housing 2 by a suitable number of screws two of which are shown at 53 in FIG. 3. A bore 54 extends through the base plate 49 and shoulder 51 in alinement with the control rod 31. The diameter of the bore 54 is appreciably larger than the diameter of the spool bore 29, and a cylindrical pilot valve plunger 56 is reciprocably mounted in the bore 54. The diameter of the plunger 56 closely approximates the diameter of the bore 54 to afford a running fit, and the diameter of the plunger 56 is larger than the diameter of the adjacent spool bore 29. The axially inner end of the plunger 56 has a plane radial end face which upon axial back and forth movement of the plunger cooperates with the adjacent radial end face of the valve spool 8 to control the flow of fluid from the right end of the valve bore 9 through the spool bore 29. The axially outer end of the pilot valve plunger 56 is spherically rounded and bears against a set screw 57 on the armature 58 of the torque motor 48.

Figure 4:
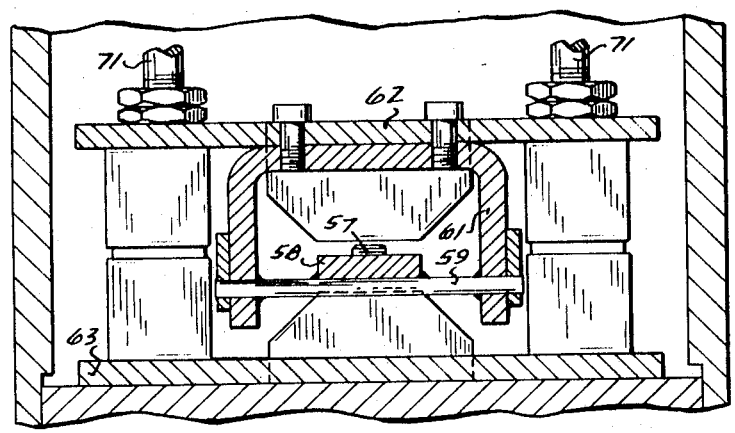
FIG. 4 is a sectional view taken on line IV—IV of FIG. 1.

The construction and mode of operation of the torque motor 48 conform with established and well known engineering principles. As shown in FIGS. 1, 3 and 4, an iron strap forming the armature 58 is secured intermediate its ends, as by welding, to a torsion rod 59 which extends transversely of the strap and is supported at its opposite ends on a frame structure including a non-magnetic yoke 61. As best shown in FIG. 4, the opposite ends of the torsion rod 59 are solidly anchored in the legs of the yoke 61, as by brazing, so as to present the armature for resilient rocking movement about the axis of the rod 59. A permanent magnetic circuit including pole pieces 62 and 63 is suitably arranged in cooperative relation to the armature 58; and surrounding the latter are field coils 64, 66 for the reception of energizing signals which, depending on their polarity and strength, will cause deflection of the armature 58 in one direction or the other as indicated by the double headed arrow 67 in FIG. 1. The set screw is threaded into a tapped hole of the armature 58 at a substantial radial distance from the torsion rod 59. As shown in FIG. 3, the set screw 57 has a slot so that it can be adjusted back and forth relative to the armature by means of a screw driver. A cover 68 for the torque motor is sealed fluid tight to the base plate 49 by means of an O-ring 69 and secured in position by studs 71 and associated cap nuts 72. Drain passages 73 and 74 in the base plate 49 and valve housing 2, respectively, connect the interior space of the cover 68 with the outlet passage 4 of the valve housing 2 for the escape of seepage fluid which may leak past the pilot valve plunger 56. The joint between the valve housing 2 and the end closure 49 is sealed by an O-ring 76.

FIG. 1 shows the spool 8 of the main valve and the armature 58 of the torque motor in a neutral condition. In that condition the lands 11 and 12 register with the ports 13 and 14, respectively, and pressure fluid entering the inlet passage 3 will be precluded from passing into the control passages 6 and 7. However, a relatively small portion of such pressure fluid will flow through the restricted passage afforded by the small clearance between the shoulder 19 and the valve bore 9, then through the recesses 18 of the collar 17 and into the space between the left end of the valve spool 8 and the adjacent shoulder 33 of the end closure 32. Similarly, another relatively small portion of the pressure fluid entering the inlet passage 3 will flow through the restricted passage afforded by the small clearance between the shoulder 24, and then through radially recessed axial passages of the collar 23 into the space between the right end of the valve spool 8 and the adjacent shoulder 51 of the end closure 49.

The plug 44 of the end closure 32 is adjusted to a position which places the coil spring 42 into a state of initial compression which is counteracted by an initial torsional deflection of the torsion bar 59 while the armature is in its midposition between the pole pieces 62 and 63. The set screw 57 of the armature 58 is adjusted to such a position that the control rod 31 will be accurately centered axially relative to valve spool 8 while axial pressure is exerted simultaneously in opposite directions upon the rod 31 by the initially compressed spring 42 and the initially deflected torsion rod 59 through the pilot valve plungers 39 and 56, respectively; and while the valve spool 8 is in its neutral position as shown in FIG. 1.

As a result of the axially centered relationship between the valve spool 8 and the rod 31, and of the slight difference in length between the rod 31 and the valve spool, the plane end face of the valve plunger 39 will be spaced a short axial distance in the order of a few thousandths of an inch from the adjacent left radial end face of the valve spool, and the plane end face of the valve plunger 56 will be spaced an equal short axial distance from the adjacent right end face of the valve spool 8, when the valve spool is in its neutral position as shown in FIG. 1.

Fluid entering the left end space of the valve bore 9 through the axial passages 18 of the collar 17 will accumulate within said space and build up a certain amount of pressure therein because the small gap between the end face of the pilot valve plunger 39 and the adjacent left end face of the valve spool 8 will restrict the outflow of fluid from said space through the valve bore 27 past the control rod 31 and into the valve bore 26 from which the fluid may drain freely through the radial bore 30 into the outlet 4.

Correspondingly, fluid entering the right end space of the valve bore 9 through the axial passages of the collar 23 will accumulate within said space and build up a certain amount of pressure therein becase the small gap between the end face of the pilot valve plunger 56 and the adjacent right end face of the valve spool 8 will restrict the outflow of fluid from said space through the valve bore 29 past the control rod 31 into the valve bore 26 from which the fluid may drain freely through the radial bore 30 into the outlet 4.

The plungers 39 and 56, and the adjacent end faces and axial bores of the valve spool 8 constitute pilot valve means operable to control fluid flow from the inlet passage 3 through end passages 27, 29 so as to establish equal fluid pressures in the end spaces of the valve bore 9 between the valve spool 8 and the adjacent end closures 32 and 49, respectively. Further, as will appear hereinbelow, the mentioned pilot valve means are also operable to increase the fluid pressure in one and simultaneously decrease the fluid pressure in the other of said end spaces, or alternately, to decrease the fluid pressure in said one and simultaneously increase the fluid pressure in said other end space.

Assuming first that an energizing signal transmitted to the torque motor 48 causes the armature 58 to push the valve plunger 56 axially inward toward the valve spool 8, it will be apparent that such action first reduces and, under sufficient signal strength, may close the gap between the flat end of the plunger 56 and the adjacent end face of the valve spool 8. At the same time, the control rod 31 pushes against the valve plunger 39 and moves it axially outward against the opposing force of the spring 42, with the result that the gap between the flat end face of the valve plunger 39 and the adjacent end face of the valve spool 8 is increased. Reducing the discharge gap at the right end of the valve spool in this manner and simultaneously widening the discharge gap at its left end, causes the fluid pressure in the right end space to rise and in the left end space to decrease. As a result, the valve spool will tend to shift toward the left, opening the port 14 and associated control passage 7 to the admission of pressure fluid from the inlet passage 3, and simultaneously opening the port 13 and associated control passage 6 to the emission of pressure fluid into the outlet passage 4.

The extent to which the ports 13 and 14 are opened by shifting of the spool 8 toward the left will correspond to the extent to which the torque motor is energized, a slight displacement of the plunger 56 toward the left in response to a relatively weak energizing signal producing only a partial opening of the ports 13 and 14, and progressive increase of the signal strength producing progressively wider opening of the ports 13 and 14.

Assuming next that an energizing signal is transmitted to the torque motor 48 in opposition to the initial torque bias upon the armature 58 which causes the plunger 56 to move in an axially outward direction with respect to the valve housing 2, it will be apparent that such action produces an effect which is opposite that produced by an axial inward push upon the plunger 56. That is, outward movement of the plunger 56 under control of the torque motor 48 causes a differential flow of fluid from the end spaces of the valve bore 9, and as a result the valve spool will tend to shift to the right, opening the port 13 and associated control passage 6 to the admission of pressure fluid from the inlet passage 3, and simultaneously opening the port 14 and associated control passage 7 to the outlet passage 4 of the valve housing 2. Again, the extent to which the ports 13 and 14 are opening by shifting of the spool 8 toward the right will correspond to the extent to which the torque motor is energized.

Shifting of the valve spool 8 within the valve bore 9 in one direction or the other from the neutral position in which it is shown in FIG. 1 is caused by build-up of unbalanced axial pressures upon it in opposite directions. The opposite end portions of the valve bore 9 in conjunction with the adjacent end faces, respectively, of the valve spool 8 define contractable and expandable fluid compartments, one at the axially inner side of the end closure 32, and the other at the axially inner side of the end closure 49. These compartments are permanently connected in restricted fluid receiving relation with the inlet passage 3 through pressure admitting passage means including diametrical recesses in the spool collars 17, 23. The compartments are further connected in fluid delivering relation with the outlet passage 4 through pressure emitting passage means including the throughbore which is afforded by the axially alined bores 26, 27 and 29 of the valve spool 8. The pilot valve means including the plungers 39 and 56 are operable to control fluid flow through the throughbores 26, 27, 29 so as either to establish equal fluid flow simultaneously from both of the contractable and expandable fluid compartments, or to establish differential fluid flows therefrom.

The small amount of pressure fluid which continuously circulates through the end spaces of the valve bore 9 while the valve spool is in its neutral position, is not only restricted but also filtered by the close radial spacing of the shoulders 19 and 24 from the surrounding cylindrical wall of the valve bore 9. Dirt, such as metal chips or rubber particles will lodge at the axially inner sides of the shoulders, and will be washed away when the valve spool is shifted to direct pressure fluid alternately into the ports 13 and 14.

While in the foregoing a preferred embodiment of the invention has been described, it should be understood that it is not intended to limit the invention to the herein disclosed form of apparatus and details of construction, and that the invention includes such other forms and details as are embraced by the scope of the appended claims.

It is claimed and desired to secure by Letters Patent:

1. An electrohydraulic servo mechanism comprising a closed center type main valve having fluid inlet, outlet and control passages in a housing part thereof, and an associated valve spool reciprocable within a valve bore of said housing part to control the flow of pressure fluid through said passages, said valve spool having a collar at each end in slidable engagement with said valve bore, axial passages through said collars, respectively, in fluid receiving relation with said inlet passage of said valve housing, and an axial passage extending through said spool from end to end and communicating intermediate its ends with said outlet passage of said valve housing, end closures for said valve bore at the axially opposite ends, respectively, of said valve spool, a rod element of greater axial length than said valve spool reciprocably mounted in said axial passage of the latter, valve elements reciprocably mounted in said end closures and cooperable, respectively, with the opposite ends of said valve spool for alternately restricting said opposite ends of said spool bore, an electric torque motor permanently urging one of said valve elements into abutting engagement with one adjacent end of said rod element, and spring means permanently urging the other of said valve elements into abutting engagement with the other adjacent end of said rod element.

2. In a two stage servo valve, the combination of a closed center type main valve comprising a housing having a valve bore, fluid inlet, outlet and control passages in communication with said valve bore, and axially spaced end closures for said valve bore; a valve spool of shorter axial length than the spacing between said end closures reciprocably mounted in said valve bore for controlling the flow of pressure fluid through said passages; opposite end portions of said valve bore in conjunction with the adjacent end faces, respectively, of said valve spool defining contractable and expandable fluid compartments; pressure admitting passage means permanently connecting said compartments in restricted fluid receiving relation with said inlet passage of said valve housing; pressure emitting passage means including an axial throughbore of said valve spool connecting said compartments in fluid delivering relation with siad outlet passage of said valve housing, a pair of auxiliary valve elements reciprocably mounted, respectively, within said end closures in axially alined cooperative relation with the opposite ends of said throughbore adjacent thereto, and axial thrust transmitting means operatively interposed between said auxiliary valve elements for conjoint actuation thereof so as to selectively establish equal or differential restricted fluid flows from said compartments through the opposite ends, respectively, of said throughbore.

3. The combination of elements set forth in claim 2, wherein said thrust transmitting means comprise a rod element reciprocably mounted in said throughbore and having a length slightly greater than the axial length of said valve spool, and spring means resiliently urging said auxiliary valve elements into abutting engagement with the opposite ends, respectively, of said rod element.

4. In a two stage servo valve, the combination of a closed center type main valve comprising a housing having a valve bore, fluid inlet, outlet and control passages in communication with said valve bore, and axially spaced end closures for said valve bore; a valve spool of shorter axial length than the spacing between said end closures reciprocably mounted in said valve bore for controlling the flow of pressure fluid through said passages; opposite end portions of said valve bore in conjunction with the adjacent end faces, respectively, of said valve spool defining contractable and expandable fluid compartments; pressure admitting passage means permanently connecting said compartments in fluid receiving relation with said inlet passage of said valve housing; pressure emitting passage means including an axial throughbore of said valve spool connecting said compartments in fluid delivering relation with said outlet passage of said valve housing, a pair of auxiliary valve elements reciprocably mounted, respectively, within said end closures in axially alined cooperative relation with the opposite ends of said throughbore adjacent thereto, axial thrust transmitting means operatively interposed between said auxiliary valve elements for conjoint actuation thereof so as to selectively establish equal or differential restricted fluid flows from said compartments through the opposite ends, respectively, of said throughbore, and fluid flow restricting and filtering means operatively associated with said pressure admitting passage means comprising an annular shoulder at each end of said valve spool slightly spaced radially from the surrounding surface of said valve bore.

5. In a two stage servo valve, the combination of a closed center type main valve comprising a housing having a valve bore, fluid inlet, outlet and control passages in communication with said valve bore, and axially spaced end closures for said valve bore; a valve spool of shorter axial length than the spacing between said end closures reciprocably mounted in said valve bore for controlling the flow of pressure fluid through said passages; opposite end portions of said valve bore in conjunction with the adjacent end faces, respectively, of said valve spool defining contractable and expandable fluid compartments; pressure admitting passage means permanently connecting said compartments in fluid receiving relation with said inlet passage of said valve housing; pressure emitting passage means including an axial throughbore of said valve spool connecting said compartments in fluid delivering relation with said outlet passage of said valve housing; pilot valve means operable to control fluid flow through said throughbore so as to either establish equal fluid flow simultaneously from both of said compartments, or to establish differential fluid flows therefrom; and fluid flow restricting and filtering means operatively associated with said pressure admitting passage means; said valve spool having a pair of axially spaced lands in cooperative relation to said control passages, respectively, and radially reduced barrel portions extending axially from the axially outer sides of said lands; and said fluid flow restricting and filtering means comprising radially enlarged annular shoulders on said barrel portions spaced, respectively, from said axially outer sides of said lands and slightly spaced radially from the surrounding surface of said valve bore.

References Cited

UNITED STATES PATENTS

| 2,655,939 | 10/1953 | Tauscher et al. | 137—625.63 |
| 2,655,940 | 10/1953 | Jackson | 137—625.63 |
| 2,843,093 | 7/1958 | Vltavsky | 137—625.64 |
| 2,977,985 | 4/1961 | Ericson et al. | 137—625.61 |
| 3,340,897 | 9/1967 | Nevulis | 137—625.6 |
| 2,803,266 | 8/1957 | Towler et al. | 137—625.66 XR |
| 2,919,679 | 1/1960 | Lincoln et al. | 137—625.68 |
| 3,209,782 | 10/1965 | Wolpin et al. | 137—625.69 XR |

FOREIGN PATENTS 203,307 12/1954 Australia.

HENRY T. KLINKSIEK, Primary Examiner